US012781110B2

(12) United States Patent
Post et al.

(10) Patent No.: US 12,781,110 B2
(45) Date of Patent: Nov. 3, 2026

(54) COPOLYMERIC ADDUCT FOR MULTI-MATERIAL, HOT MELT ADHESIVE BONDING

(71) Applicant: Zephyros, Inc., Romeo, MI (US)

(72) Inventors: Ethan Post, Romeo, MI (US); Michael Czaplicki, Romeo, MI (US); Donald Paquet, Romeo, MI (US)

(73) Assignee: ZEPHYROS, INC., Romeo, MI (US)

( * ) Notice: Subject to any disclaimer, the term of this patent is extended or adjusted under 35 U.S.C. 154(b) by 44 days.

(21) Appl. No.: 18/572,559

(22) PCT Filed: Jun. 22, 2022

(86) PCT No.: PCT/US2022/034455
§ 371 (c)(1),
(2) Date: Dec. 20, 2023

(87) PCT Pub. No.: WO2022/271781
PCT Pub. Date: Dec. 29, 2022

(65) Prior Publication Data
US 2024/0318056 A1 Sep. 26, 2024

Related U.S. Application Data
(60) Provisional application No. 63/213,409, filed on Jun. 22, 2021.

(51) Int. Cl.
*C08F 2/46* (2006.01)
*C08F 2/50* (2006.01)
*C08G 61/04* (2006.01)
*C09J 5/06* (2006.01)
*C09J 175/04* (2006.01)
*A43B 9/12* (2006.01)
*A43B 13/32* (2006.01)
*A43B 23/02* (2006.01)

(52) U.S. Cl.
CPC ............... *C09J 175/04* (2013.01); *C09J 5/06* (2013.01); *A43B 9/12* (2013.01); *A43B 13/32* (2013.01); *A43B 23/0255* (2013.01); *C09J 2475/00* (2013.01)

(58) Field of Classification Search
CPC ........ C09J 175/04; C09J 5/06; C09J 2475/00; A43B 9/12; A43B 23/0255; A43B 13/32; C08L 51/06; C08L 53/00; C08L 2205/035; B32B 7/12; C08G 2170/20
USPC ....... 522/103, 100, 1, 71, 189, 184, 6; 520/1
See application file for complete search history.

(56) References Cited

U.S. PATENT DOCUMENTS

| | | | | |
|---|---|---|---|---|
| 4,883,837 | A | 11/1989 | Zabrocki | |
| 6,072,003 | A | 6/2000 | Horrion | |
| 2007/0213431 | A1 | 9/2007 | Adur | |
| 2017/0240784 | A1 * | 8/2017 | Jin | C08L 23/06 |
| 2020/0123358 | A1 | 4/2020 | Krishnaswamy | |

FOREIGN PATENT DOCUMENTS

| | | | | | |
|---|---|---|---|---|---|
| CN | 102015876 | A | | 4/2011 | |
| CN | 109401715 | A | | 3/2019 | |
| CN | 109679532 | A | * | 4/2019 | C09J 123/0853 |
| CN | 110669308 | A | | 1/2020 | |
| CN | 110903805 | A | | 3/2020 | |
| CN | 112694850 | A | | 4/2021 | |
| CN | 112724656 | A | | 4/2021 | |
| EP | 1235879 | B1 | | 5/2004 | |
| EP | 1471087 | | * | 10/2004 | |
| EP | 2125918 | B1 | | 6/2012 | |
| WO | 03/106563 | A1 | | 12/2003 | |
| WO | WO-2016028970 | A1 | * | 2/2016 | C09J 153/00 |

OTHER PUBLICATIONS

Ye et al, CN 109679532 Machine Translation, Apr. 26, 2019 (Year: 2019).*
PCT International Search Report & Written Opinion dated Sep. 23, 2022, Application No. PCT/US2022/034455.
Zuoxiang Zeng: "Hot melt adhesive properties of PA/TPU blends compatibilized by EVA-g-MAH" Journal of Adhesion Science and Technology, vol. 31, No. 9, Sep. 27, 2016 (Sep. 27, 2016), pp. 943-957.
Ma et al. in "Compatibilization and properties of ethylene vinyl acetate copolymer (EVA) and thermoplastic polyurethane (TPU) blend based foam" Polym. Bull. 71, 2219-2234 (2014).
Vietnam Office Action, VN Application No. 1-2024-00420, dated May 8, 2026.
Xianlu Pan, Hot melt adhesive properties of PA/TPU blends compatibilized by EVA-g-MAH, Journal of Adhesion Science and Technology, Sep. 24, 2016.
Chinese Search Report, CN Application No. 2022800523100, dated Apr. 30, 2026.
Chinese Office Action, CN Application No. 2022800523100, dated May 6, 2026.

* cited by examiner

*Primary Examiner* — Jessica Whiteley
(74) *Attorney, Agent, or Firm* — The Dobrusin Law Firm, P.C.; Eric S. Hydorn

(57) ABSTRACT

The present teachings generally relate to an adhesive or adhesive component for multi-material hot melt adhesive bonding. The adhesive or adhesive component comprises a reaction product of two or more monomers or prepolymers, wherein the reaction product includes a polymer backbone that adapts the adhesive or adhesive component for improved bonding of dissimilar substrates.

20 Claims, 3 Drawing Sheets

COPOLYMERIC ADDUCT FOR MULTI-MATERIAL, HOT MELT ADHESIVE BONDING

CROSS-REFERENCE TO RELATED APPLICATIONS

The present application is a national phase of International Application No. PCT/US2022/034455 (filed Jun. 22, 2022), which claims priority to U.S. Provisional Application No. 63/213,409 (filed Jun. 22, 2021), both of which are incorporated by reference in their entirety for all purposes.

FIELD

The present teachings generally relate to a copolymer adduct-based adhesive for multi-material hot melt adhesive bonding.

BACKGROUND

Bonding multiple substrates of both low and high surface energy with varying degrees of polarity is difficult as the two or more substrate materials themselves are usually immiscible due to inherent incompatibilities in the blend. If the differing substrates were melt-compounded, they would maintain larger separate phases when mechanically mixed instead of creating a more homogeneous mixture. Due to this incompatibility, developing a hot melt adhesive to bond substantially dissimilar substrates is difficult. It requires the adhesive to have affinity for both types of substrates, which can produce miscibility problems among ingredients in the adhesive composition. At times, bonding dissimilar substrates can be achieved by using a primer, in addition to the adhesive, or sometimes multiple layers of adhesive. However, the use of both primers and adhesives, or multiple layers of adhesive, are typically undesirable due to time constraints and cost considerations.

For example, a hot melt adhesive based on a blend of polymers with differing chemical polarities may have domains of the immiscible material and may suffer from further phase separation on heating and/or poor crystalline structure. Large phase-separated domains can lead to poor heat resistance in a hot melt adhesive bond. As heat is applied, the adhesive bond will fail at lower temperatures under load than a more homogeneous or finer crystalline system due to slippage along the larger phase-separated boundaries. Furthermore, phase-separated adhesive will have lower cohesive strength due to limited phase interactions and the failure to transfer stress from one phase to another. Adhesives based on higher molecular weight or more crystalline materials, which have higher creep resistance, typically require higher temperatures or greater stress to deal with the high viscosity while dispensing the melt. This is less than ideal due to cost and decreased ease of application.

Previous work has been done to generally compatibilize immiscible polymer systems and improve their mechanical properties or obtain advantages of varying material classes, including polyolefin and polyolefin blends. This is typically done by adding a low wt % of a compatibilizing agent or creating a copolymer with specific coupling agents.

For example, European Patent No. 1235879 discloses a blend of thermoplastic polyurethane, a polymeric hydrocarbon, and compatibilizer, which is a polymeric hydrocarbon with pendant isocyanate-reactive groups or polyoxyalkylene groups, most preferably at <10 wt %. This material yields polymer articles with enhanced mechanical properties.

European Patent No. 2125918 discloses the use of a polyolefin polymer, a thermoplastic polyurethane, and an imide functionalized polyolefin at <10 wt % to yield a composition capable of adhesion to polar substrates and formation of articles.

U.S. Pat. No. 4,883,837 discloses compatibilized blends comprising a polyolefin and thermoplastic polyurethane with 10-35 wt % modified polyolefin copolymer having main or side chains with carboxylic acid, carboxylate ester, carboxylic acid anhydride, carboxylate salts, amide, epoxy, hydroxy, or acyloxy functional groups. The blend avoids delamination or related problems in thermally formed products.

U.S. Publication No. 20200123358 claims a composition of ethylene vinyl acetate (EVA), thermoplastic polyurethane, and <10 wt % of a compatibilizer consisting of an organic peroxide, ethylene methyl acrylate-glycidyl methacrylate terpolymer, styrene acrylonitrile-epoxy, polypropylene carbonate-diol, or combinations thereof. This composition has increased tensile properties in molded products.

U.S. Publication No. 20070213431 discloses a composition including an elastomer from a thermoplastic polyolefin, a silicone rubber elastomer, and <10 wt % compatibilizing agent comprising a silicone-containing polymer. The material maintains the oil and high temperature resistance of silicones while lowering the cost with use of inexpensive polyolefins.

U.S. Pat. No. 6,072,003 discloses block copolymers of chemically modified polyolefin, thermoplastic polyurethane, and a coupling agent at <5 wt % to develop adhesion to polar engineering resins including polyamides, polybutylene terephthalate, polyethylene terephthalate, styrene acrylonitrile butadiene, polycarbonate polyphenylene oxides, polyphenylene sulfides and polyacetals. The coupling agent is a diisocyanate or optionally, diamines, diols, diepoxides, amino/hydroxy or amino/epoxy compounds with up to 18 carbon atoms. The block copolymer was also able to compatibilize polar and non-polar polymer blends when used in 1-40 wt %.

PCT Patent Application No. PCT/US03/16067 discloses a copolymer for molded articles from a thermoplastic polyurethane, a blend partner polymer capable of reacting with isocyanate, and a polyisocyanate to increase the tensile strength and abrasion resistance of the material over just the polymer blend at the expense of higher viscosity during processing.

Ma et al. in "Compatibilization and properties of ethylene vinyl acetate copolymer (EVA) and thermoplastic polyurethane (TPU) blend based foam" Polym. Bull. 71, 2219-2234 (2014), coupled TPU and EVA-g-MAH using 4,4'-diamino diphenyl methane. EVA/TPU blends made with this compatibilizer at <9 wt % improved the tensile strength, elongation at break, tear strength and compression set of the foams.

In view of the aforementioned prior art compatibilizing immiscible polymers, none have addressed the difficulty of creating strong bonding between high and low surface energy substrates simultaneously with a single adhesive and without the use of a primer. It would be desirable to a provide a method of synthesizing a polymeric material that solves this problem, without the introduction of an additional reagent or coupling agent, thus decreasing processing steps and minimizing chemical hazards. It would be desirable to provide an adhesive or adhesive component utilizing a copolymer adduct that enables multi-material bond strengths higher than an equivalent polymer blend containing identical but non-adducted constituents. It would be desirable to provide a copolymer adduct-based hot melt adhesive or adhesive ingredient with better heated creep resistance, while also improving molten dispensability.

SUMMARY

The present disclosure relates to an adhesive or adhesive component, which may address one or more of the above needs by providing the adhesive or adhesive component comprising: a reaction product of two or more monomers or prepolymers, wherein the reaction product includes a polymer backbone with segments present for preferred adhesion of a particular substrate type which two or more non-identical substrates are intended to be adhered, that adapts the adhesive or adhesive component for improved bonding of dissimilar substrates.

The present disclosure relates to an adduct, which may address one or more of the above needs by providing an adduct of: a thermoplastic polyurethane and a chemically modified polyolefin, wherein the thermoplastic polyurethane is chemically bonded to the chemically modified polyolefin.

The present disclosure further relates to a method for bonding a first substrate to a second substrate, wherein the first substrate is dissimilar to the second substrate, the method comprising the steps of (a) applying a hot melt adhesive polymer formulation to the first substrate; and (b) applying the second substrate to the product obtained in step (a) such that the hot melt adhesive polymer formulation is located between the first substrate and the second substrate.

The adhesive or adhesive component described herein may include one or more of the following aspects. The adhesive or adhesive component may include one or more components for forming a hot melt adhesive. For example, the adhesive may be a holt melt adhesive polymer formulation comprising or essentially consisting of an adduct (adhesive component). The adhesive or adhesive component may enable simultaneous bonding to low surface energy substrates and high surface energy substrates. The adhesive or adhesive component may facilitate bonding to substrates with no primer or pretreatment. The adhesive or adhesive component may be substantially free of any coupling agent. The adhesive or adhesive constituent may be formed by the coupling of dissimilar monomers or prepolymers with polyisocyanates, bismaleimides, carbodiimides or other coupling agents.

The adhesive or adhesive component may be applied to an upper of a shoe, a midsole of a shoe, an outsole of a shoe, or some combination thereof. The adhesive or adhesive component may bond to at least two of an ethylene vinyl acetate-based foam mid-sole, a polyurethane-based shoe upper, and a non-woven polyester. The adhesive or adhesive component may be formed as a film. The adhesive or adhesive component may be formed as a powder.

The adhesive or adhesive component may comprise a thermoplastic polyurethane component and a chemically modified polyolefin. The thermoplastic polyurethane may be chemically bonded to the chemically modified polyolefin in the absence of any coupling agent. The chemically modified polyolefin may be ethylene vinyl acetate copolymer, polyethylene or terpolymer with maleic anhydride content.

The reaction product may comprise a copolymer, terpolymer, or higher order polymer adduct. The reaction product may have differential affinity for two or more substrate types. Forming of the reaction product may substantially avoid phase separation of partially or poorly miscible ingredients.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings provide for an adhesive or adhesive component. The adhesive or adhesive component may function to bond two or more dissimilar substrates (e.g., substrates of high and low surface energy; substrates of differing polarity). The adhesive or adhesive component may function to bond two or more dissimilar substrates without the use of an additional reagent, coupling agent, primer, or pretreatment process. The adhesive or adhesive component may include one or more components for forming a hot melt adhesive. For example, the adhesive may be a holt melt adhesive polymer formulation comprising or essentially consisting of an adduct (adhesive component). The adhesive or adhesive component formulation may comprise a reaction product of two or more monomers or prepolymers.

The reaction product may include a polymer backbone that adapts the adhesive or adhesive component for improved bonding of dissimilar substrates. The reaction product may include a copolymer, terpolymer, or higher order polymer adduct.

Figure 1:
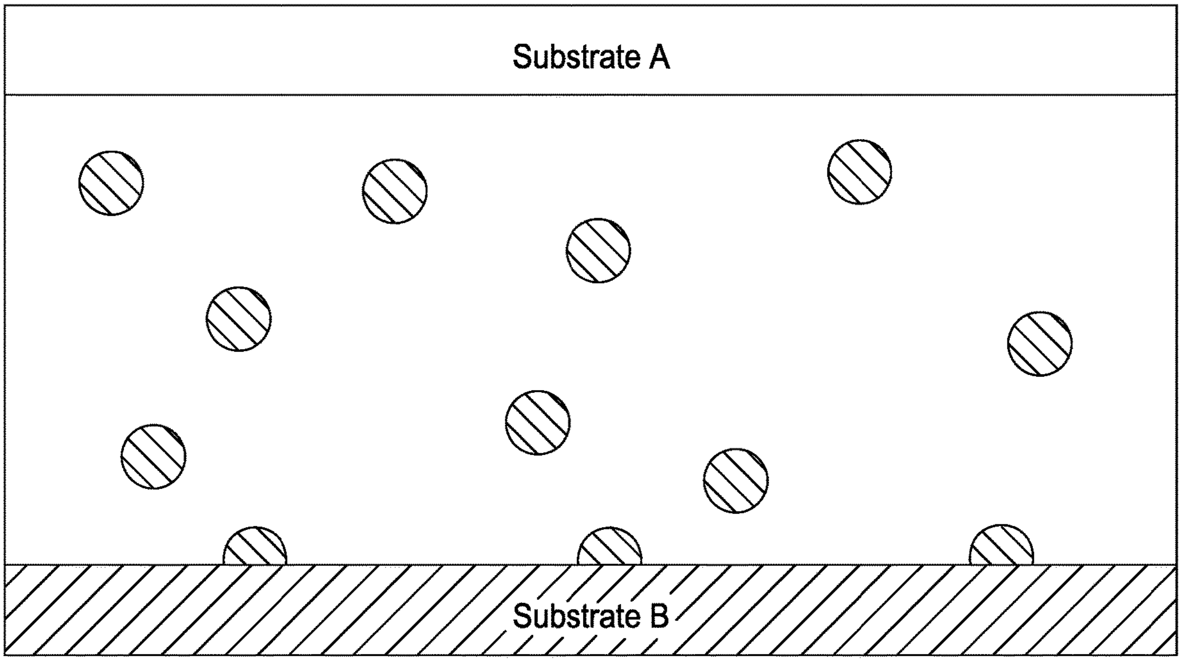
FIG. 1 shows a representation of an adhesive, between dissimilar substrates A and B, containing phase-separated, immiscible components with the cross-hatched dispersed phase having preferential interaction with substrate B and the continuous phase preferably interacting with substrate A.
Figure 2:
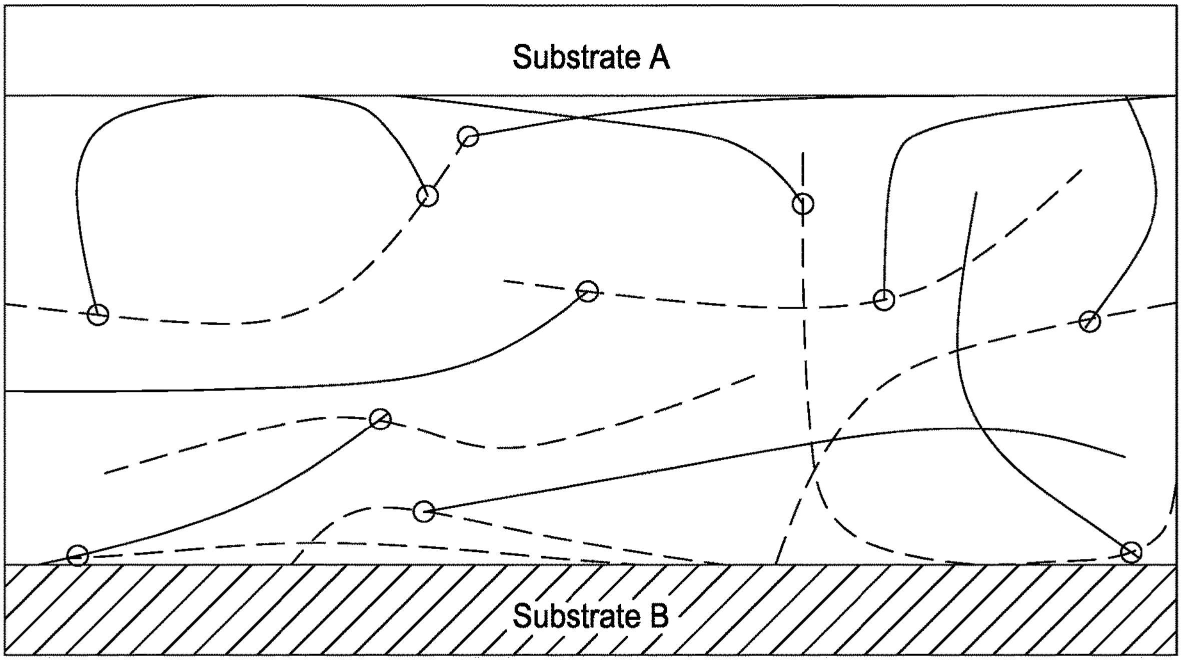
FIG. 2 shows a representation of an adhesive, between dissimilar substrates A and B, consisting of a more homogeneous copolymer adduct, where each circle represents a covalent bond between dissimilar polymer chains comprising the copolymer. The dashed line is the copolymer adduct component with preferential interaction with substrate B and the solid line is the copolymer adduct component with preferential interaction with substrate A.

The copolymer, terpolymer, or higher order polymer adduct may function to enhance the bond strength between two or more dissimilar substrates by creating a more homogeneous adhesive. The copolymer, terpolymer, or higher order polymer adduct may function to stabilize the adhesive formulation and prevent and/or decrease phase separation of the otherwise partly or poorly miscible components. The copolymer, terpolymer, or higher order polymer adduct may function to promote differential affinity for the two or more dissimilar substrates due to its polymer backbone synthesized from two or more dissimilar monomers, or prepolymers. FIG. 1 represents how a poorly miscible compound may be dispersed in a purely blended polymer system without any adducted copolymer present. In this adhesive between dissimilar substrates A and B, one polymer forms discrete particles in the other dissimilar polymer phase. In this diagram the cross-hatched particles have more affinity for substrate B, while the continuous phase preferably interacts with substrate A. This system has a lack of favorable interaction area with substrate B and will develop insufficient bond strength. FIG. 2 represents a more homogeneous adhesive, between substrates A and B, comprising a copolymer adduct of typically immiscible or poorly immiscible polymer constituents. Each circle along the chain lengths represents a covalent bond between the dissimilar copolymer components (dashed and solid lines). The dashed lines have favorable interaction with substrate B and the solid lines have favorable interaction with substrate A. This adhesive has favorable interaction with both dissimilar substrates for greater adhesion and also favorable interactions within the adhesive for greater cohesive strength and heat stability. The copolymer, terpolymer, or higher order polymer adduct may function to improve the flow of the adhesive or adhesive component to prevent die swell. The copolymer, terpolymer, or higher order polymer adduct may be synthesized by chemically bonding two or more dissimilar polymers together. The copolymer, terpolymer, or higher order polymer adduct may improve adhesive thermal stability as compared to identical but non-adducted constituents.

The synthesized copolymer adduct may comprise one or more chemically modified polyolefins bonded to a thermoplastic polyurethane (TPU). The one or more chemically modified polyolefins may be in grafted form. Preferably, the chemically modified polyolefin is an ethylene copolymer or terpolymer and may be in grafted form. More preferably, the chemically modified polyolefin is ethylene vinyl acetate based polymer with maleic anhydride content. The TPU may be a nucleophile terminated TPU. Preferably, the TPU is a hydroxyl-terminated TPU.

The synthesized copolymer adduct may be prepared by any suitable method known in the art. The synthesized copolymer adduct may be formed by melt processing. Any melt mixing process known in the art may be utilized to perform the reaction. For example, the polymers may be dispensed in a mixer and mixed until the adduct is formed. A catalyst may be added during mixing for accelerating the reaction. The catalyst may be any suitable catalyst known in the art and literature.

The synthesized copolymer adduct may be present in an amount from about 20 wt % to about 100 wt % of the hot melt adhesive polymer formulation. Preferably, the synthesized copolymer adduct may be present in an amount from about 50 wt % to about 100 wt % of the hot melt adhesive polymer formulation.

The adhesive or adhesive component formulation may further contain a tackifier resin. The tackifier resin may function to improve tack, peel adhesion, and modify viscosity. The tackifier resin can be any conventional tackifier resin that is known in the art and literature. The tackifier resin may be present in an amount from about 0 wt % to about 15 wt % of the hot melt adhesive polymer formulation. The tackifier resin may be present in an amount from about 1.5 wt % to about 10 wt % of the hot melt adhesive polymer formulation. The tackifier resin may be present in an amount from about 2 wt % to 3.5 wt % of the hot melt adhesive polymer formulation. The tackifier resin may be present in an amount from about 3 wt % of the hot melt adhesive polymer formulation. The adhesive or adhesive component formulation may lack a tackifier resin. Although higher percentages of tackifying resin may be used, it may cause viscosity to decrease too much or harm adhesion.

The adhesive or adhesive component formulation may further comprise one or more additional polymers or copolymers. For example, the adhesive or adhesive component formulation may further comprise free TPU. The term "free TPU" as used in this specification refers to additional TPU that is not utilized in the formation of the adduct. The free TPU may be of the same TPU polymer type as used in the formation of the copolymer adduct. The free TPU may be of a different TPU polymer type as used in the formation of the copolymer adduct. The free TPU may be added to the hot melt adhesive polymer formulation after the formation of the copolymer adduct. The free TPU may be present in an amount from about 5 wt % to 65 wt % of the hot melt adhesive polymer formulation. The hot melt adhesive polymer or adhesive polymer ingredient formulation may lack additional TPU.

The adhesive or adhesive component formulation may further comprise one or more free modified or unmodified polyolefin polymers. The term "free modified or unmodified polyolefins" as used in the specification refers to additional polyolefin added to the formulation that is not utilized in the formation of the adduct. The free polyolefin may be of the same type as used in the formation of the copolymer adduct. The free polyolefin may be of a different type as used in the formation of the copolymer adduct. The free polyolefin polymer may be added to the hot melt adhesive polymer formulation after the formation of the copolymer adduct. The one or more free polyolefin polymers may be present in an amount from about 0 wt % to 35 wt % of the hot melt adhesive polymer formulation. The hot melt adhesive polymer or adhesive polymer ingredient formulation may lack one or more additional modified or unmodified polyolefins.

The adhesive or adhesive component may be dispensed using a hot melt applicator. The adhesive or adhesive component may be dispensed directly onto a substrate during assembly. The adhesive or adhesive component may be dispensed directly onto a first substrate for bonding to a second substrate that is dissimilar to the first substrate. The adhesive or adhesive component may be pre-formed into various profiles such as a sheet, film, ribbon, pipe, or other shaped articles for use during assembly. The adhesive may be made into a powder and deposited onto a surface.

The adhesive or adhesive component may be used where equivalent blended polymer compositions without copolymer adduct formation are currently used. More particularly, the adhesive or adhesive component may be used to bond shoe uppers, midsoles of shoes, and outsoles of shoes, or some combination thereof. The adhesive or adhesive component may allow for superior bonding between low surface energy ethylene copolymer-based foam and higher surface energy polyurethane (PU) without the use of an additional reagent, coupling agent, primer, or pretreatment process. The adhesive or adhesive component may allow for superior bonding between low surface energy ethylene copolymer-based foam and non-woven polyester-based fabric without the use of an additional reagent, coupling agent, primer, or pretreatment process.

EXAMPLES

The present teachings may be further explained by the following non-limiting examples.

Illustrative Examples 1-7 show hot melt adhesive compositions with various levels of copolymer adduct comprising 0 wt % (Example 6; unreacted, equivalent blend), 25 wt % (Example 5), 50 wt % (Example 4), 75 wt % (Example 3), 80.4 wt % (Example 8), 87 wt % (Example 2 and Example 7), and 100 wt % (Example 1) adduct, as shown in Table 1 below.

TABLE 1

Adhesive Compositions with Varying Levels of Copolymer Adduct

| Ingredient | Example 1 (wt %) | | Example 2 (wt %) | | Example 3 (wt %) | | Example 4 (wt %) | |
|---|---|---|---|---|---|---|---|---|
| Pre-reacted total adduct | 100 | | 87 | | 75 | | 50 | |
| TPU-EVA | Adduct ingredient | Wt % | Adduct ingredient | Wt % | Adduct ingredient | Wt % | Adduct ingredient | Wt % |
| Copolymer | TPU | 57.84 | TPU | 50.32 | TPU | 43.38 | TPU | 28.92 |
| Adduct | EVA #1 | 31.55 | EVA #1 | 27.45 | EVA #1 | 23.66 | EVA #1 | 15.78 |
| Composition | EVA #2 | 10.52 | EVA #2 | 9.15 | EVA #2 | 7.89 | EVA #2 | 5.26 |
| | Basic catalyst | 0.09 | Basic catalyst | 0.078 | Basic catalyst | 0.067 | Basic catalyst | 0.045 |
| TPU | 0 | | 10 | | 16.9 | | 31.4 | |
| Modified EVA #1 | 0 | | 0 | | 3.8 | | 11.7 | |
| Modified EVA #2 | 0 | | 0 | | 1.3 | | 3.9 | |
| Tackifier Resin | 0 | | 3 | | 3.0 | | 3.0 | |
| Non-reacted total | 0 | | 13 | | 25 | | 50 | |

| Ingredient | Example 5 (wt %) | | Example 6 (wt %) | | Example 7 (wt %) | | Example 8 (wt %) | |
|---|---|---|---|---|---|---|---|---|
| Pre-reacted total adduct | 25 | | 0 | | 87 | | 80.4 | |
| TPU-EVA | Adduct ingredient | Wt % | Adduct ingredient | Wt % | Adduct ingredient | Wt % | Adduct ingredient | Wt % |
| Copolymer | TPU | 14.46 | TPU | 0 | TPU | 50.27 | TPU | 51.97 |
| Adduct | EVA #1 | 7.89 | EVA #1 | 0 | EVA #3 | 27.42 | PE | 14.18 |
| Composition | EVA #2 | 2.63 | EVA #2 | 0 | EVA #4 | 9.14 | EVA #2 | 14.18 |
| | Basic catalyst | 0.022 | Basic catalyst | 0 | Tin catalyst | 0.020 | Basic catalyst | 0.07 |
| | | | | | Diisocyanate | 0.15 | | |
| TPU | 45.9 | | 60.4 | | 10 | | 9.53 | |
| Modified EVA #1 | 19.6 | | 27.5 | | 0 | | 0 | |
| Modified EVA #2 | 6.5 | | 9.1 | | 0 | | 0 | |
| Tackifier Resin | 3.0 | | 3 | | 3 | | 10.07 | |
| Non-reacted total | 75 | | 100 | | 13 | | 19.6 | |

The preparation of the adhesive or adhesive component may be achieved by any suitable method known by those of ordinary skill in the art. For instance, Example 2 was prepared by using a sigma blade style mixer to agitate the material at 260° F. The TPU was melted followed by the chemically modified polyolefins (maleic anhydride modified in this case). After thorough mixing, a basic catalyst was added to enhance the reaction of the hydroxyl-terminated TPU with the modified polyolefin through its maleic anhydride groups over a period of 1 hour at 55 rpm. After forming the TPU-polyolefin copolymer adduct, additional free TPU and tackifier resin were added and mixed for 30 minutes to complete the adhesive formulation.

Another suitable preparation route is seen in Example 7. Example 7 was prepared using a sigma blade style mixer at 248° F. Hydroxyl-terminated TPU was melted and a diisocyanate was allowed to mix for 2 minutes at 55 rpm. A catalyst was added to achieve isocyanate-terminated TPU after 20 minutes at 55 rpm. Methyacrylic acid-containing polyolefin terpolymer was added and allowed to mix for 20 minutes, yielding a TPU-polyolefin copolymer adduct. After formation of the copolymer adduct, additional free TPU and tackifier resin were added and blended for 20 minutes to complete the adhesive formulation.

The control sample (Example 6), without adduct formation, is mixed for 20 minutes total as it does not undergo the extended 1-hour step for the reaction to occur. Example 6 is identical in composition to Example 2, a preferred formulation, except that no catalyst is added and no adduct is formed during its mixing.

Examples 3-5 are based on Example 2, but as the adduct level is reduced, the adduct is replaced by its unreacted precursor ingredients minus the catalyst.

Example 8 is based on Example 2, but a chemically modified polyethylene-based (PE) polymer is utilized in the adduct composition.

Figure 3:
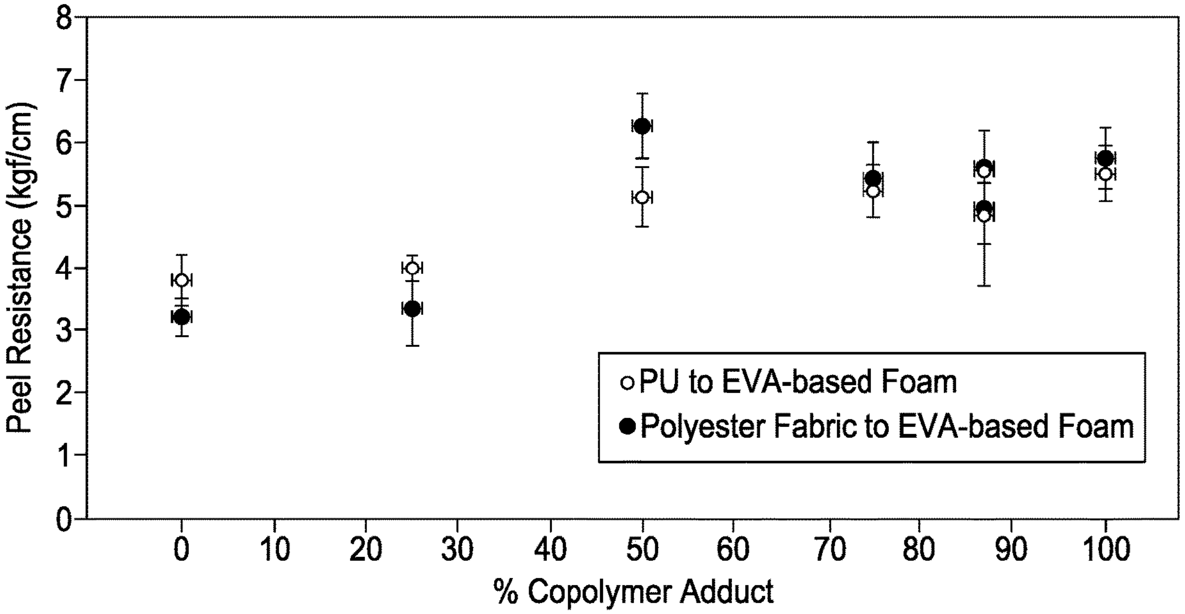
FIG. 3 shows the impact of increasing the % of copolymer adduct, in Examples 1-7, on the peel resistance of the adhesive.

Table 2, below, shows the results of adhesive peel strength and other physical property testing for non-limiting Example compositions 1-8 in accordance with the present teachings. FIG. 3 presents the data from Table 2 in a visual manner that readily shows the impact of the % Copolymer Adduct versus the test specimen peel resistance.

film was flash heated, with a heat lamp, on one substrate to 134±4° C. over 15 seconds, provided a 20 second open time, assembled with the second substrate, and pressed together at 1 bar for 30 seconds to form a bonded assembly for testing. An MTS QTest/10 elite instrument with a 250 N load cell was used to test the adhesive by peeling at a 50 mm/min rate to obtain an average force per unit width measurement.

For the heated creep test, samples were prepared by placing a 1 in×3 in×0.8 mm adhesive film, aligned to one end, between two 0.6 mm thick woven polyester fabrics of 1.2 in×4.5 in size. The polyester fabric was used as the creep test substrate due to its lack of deformation (i.e., stretching) during testing and assurance that the adhesive was tested for creep due to cohesive failure. This was pressed at 300° F. for 1 minute, with 1.6 mm spacers to control bond line thickness. The assembly's edges were trimmed, for consistent edges, to 1 inch width. A hole was punched 0.5 inches from the bond line, so the assembly could be hung in an oven in a T-peel configuration with a 1 kg mass load for 30 minutes. Absence of bond line peeling at a set temperature indicated a passing score ("Yes") on the creep test.

The viscosity was tested with parallel plate dynamic mechanical analysis at 145° C. and 1 Hz (Pa·s) and at 200° C. and 1 Hz (Pa·s).

TABLE 2

Effect of % Copolymer Adduct on Adhesive Bonding and Properties

| | % Copolymer Adduct in Formula | Non-woven polyester fabric to EVA-based foam peel resistance (kgf/cm) | PU to EVA-based foam peel resistance (kgf/cm) | Complex Viscosity at 145° C. and 1 Hz (Pa · s) | Complex Viscosity at 200° C. and 1 Hz (Pa · s) | Enthalpy of Crystallization (J/g) | Passes 65° C. Creep Test with 1 kg load |
|---|---|---|---|---|---|---|---|
| Example 1 | 100 | 5.73 ± 0.48 | 5.49 ± 0.44 | 1417.56 | 359.96 | 44.35 | Yes |
| Example 2 | 87 | 5.58 ± 0.59 | 5.54 ± 0.60 | 1138.39 | 277.11 | 38.34 | Yes |
| Example 3 | 75 | 5.40 ± 0.60 | 5.22 ± 0.42 | 1289.85 | 401.71 | 34.95 | Yes |
| Example 4 | 50 | 6.25 ± 0.52 | 5.13 ± 0.46 | 1373.24 | 387.60 | 35.06 | Yes |
| Example 5 | 25 | 3.33 ± 0.58 | 3.98 ± 0.20 | 1223.22 | 348.33 | 33.77 | Yes |
| Example 6 | 0 | 3.20 ± 0.29 | 3.78 ± 0.40 | 1390.83 | 327.67 | 34.70 | No |
| Example 7 | 87 | 4.93 ± 1.24 | 4.85 ± 0.48 | 1693.80 | 446.74 | 32.99 | Yes |
| Example 8 | 80.4 | 3.32 ± 0.26 | 4.14 ± 0.08 | 423.83 | 163.44 | 46.60 | No |

As can be seen in Table 2 and described herein previously, Example 7 is a different chemical system with altered preparation, so its properties will not show a pattern with the other examples. The alternative preparation shows an additional means, using a diisocyanate linker, to achieve an adduct with enhanced bonding over the control, Example 6. Example 8 is shown to demonstrate flexibility in the choice of chemically modified polyolefin by using a polyethylene-based polymer instead of ethylene vinyl acetate-based polymer in the adduct. This is not an optimized formula by any means, due to decreased polyester fabric to EVA bonding and creep resistance, but demonstrates that multi-material bonding can be maintained between PU and EVA substrates while lowering the polarity of the adhesive. This has utility in bonding to lower surface energy substrates.

The following non-limiting methods and parameters were used for testing of bond strength score, viscosity, creep test, and enthalpy of crystallization; results are described herein below and reported in Table 2:

The substrates were cut to 1 cm×15 cm cross-sectional area. Samples were prepared with a 1 cm×15 cm×0.3 mm thick film of the hot melt adhesive. The hot melt adhesive The copolymer adduct-based adhesive bond strengths in Table 2 (and plotted in FIG. 3) show large increases in peel strength from 3.20 kgf/cm (0% adduct) to 5.73 kgf/cm (100% adduct) on non-woven polyester fabric to EVA-based substrates and from 3.78 kgf/cm (0% adduct) to 5.49 kgf/cm (100% adduct) on EVA-based materials to PU-based materials. Additionally, a third class of bonding between a TPU-based material and EVA-based foam, using Example 2, achieved a 4.00 kgf/cm bond strength.

The results indicate that 50 to 100 wt % copolymer adduct-based adhesives have greatly enhanced peel force for both non-woven polyester fabric to EVA-based foam and PU to EVA-based foam, while the 25 wt % adduct formulation shows reduced improvement over the blended control with 0 wt % adduct. The wide window of effectiveness of the copolymer adduct for improving multi-material bonding presents flexibility in the formulation to tailor other desirable adhesive properties. Furthermore, the ability to adjust the polarity and surface energy of the adduct, by changing the polyolefin in the adduct (polyethylene-based polymer utilized in Example 8), provides a key lever in tuning the polarity of the hot melt adhesive to increase compatibility with a greater range of substrates of varying surface energy. The lower limit of substrate surface energy can be pushed without losing bonding to higher surface energy substrates such as the TPU.

With regard to enthalpy of crystallization and creep test results, the Example 2 formulation shows a third crystalline phase/peak in the differential scanning calorimetry (DSC) crystallization thermogram and increased crystallinity as the crystallization enthalpy increases from 34.7 J/g (Example 6, control without adduct) to 38.3 J/g (see Table 2). Generally, systems with higher levels of adduct have greater crystallinity, as seen in Examples 1 and 2 with 100 wt % and 87 wt % copolymer adduct, respectively. This contributes to formulations with adduct, as low as 25 wt % adduct, passing a 65° C. creep test (supporting a 1 kg mass for 30 minutes), while non-adducted Example 6 fails completely at this temperature. Example 6 is identical to Example 2 except no reaction has occurred in that formulation, so the advantages of the molecular weight increase and copolymer characteristics by adduction are clearly demonstrated. As discussed previously, the presence of significant levels of copolymer adduct, formed from typically immiscible polymers when in the non-adducted form, prevents the adhesive blend from phase separating upon heating. This contributes to the enhanced heat resistance in the creep test as well as the greater adhesive peel resistance simultaneously between both high and low surface energy substrates. These are key attributes of the invention. The copolymer achieves this creep resistance without hampering the material flow characteristics or its dispensability, by not increasing melt viscosity. Surprisingly, formulations with higher levels of adduct can show decreases in the molten viscosity.

With regard to viscosity, the viscosity of the Example 6 blended system, with no adduction between TPU-based and EVA-based polymers, is 1390.8 Pa's at 145° C., while Example 2 is 1138.4 Pa·s. Despite the expected increase in molecular weight through adduction, Example 2 has a decreased melt viscosity for easier dispensing due to the copolymer adduct. As the wt % of adduct in a formulation decreases in Examples 3-5, the viscosity decrease is still apparent at 145° C., but not at 200° C. compared to Example 6 without adduct. However, it is not an unusual phenomenon for viscosity differences to decrease or disappear due to increases in test temperature or shear rate. Again, the adduct is a higher molecular weight, so the 100% adduct Example 1 has a slightly higher viscosity than a non-adducted equivalent system. The adduct alone, Example 1, shows higher viscosity at 145° C., as expected from higher molecular weight material, but shows decreased viscosity when compounded with small percentages of other polymer and tackifier, see Examples 2, 3, 4 and 5.

Without being bound by theory, the higher tan delta of the viscoelastic material demonstrates that it is more viscous loss and is less elastic, thereby reducing die swelling during dispensing. Reduced melt elasticity decreases the driving force for polymer chains to re-coil immediately from molecular orientation induced from melt processing as they pass through the die orifice. The lower viscosity is unique to this copolymer system because Martin and Velankar in "Effects of compatibilizer on immiscible polymer blends near phase inversion" discovered that a system using a small percentage of compatibilizer actually increased the viscosity. This appears to be a surprising advantage of this copolymer-based adhesive approach versus a blend of immiscible polymers compatibilized by a small percent of a compatibilizer additive.

Figure 4:
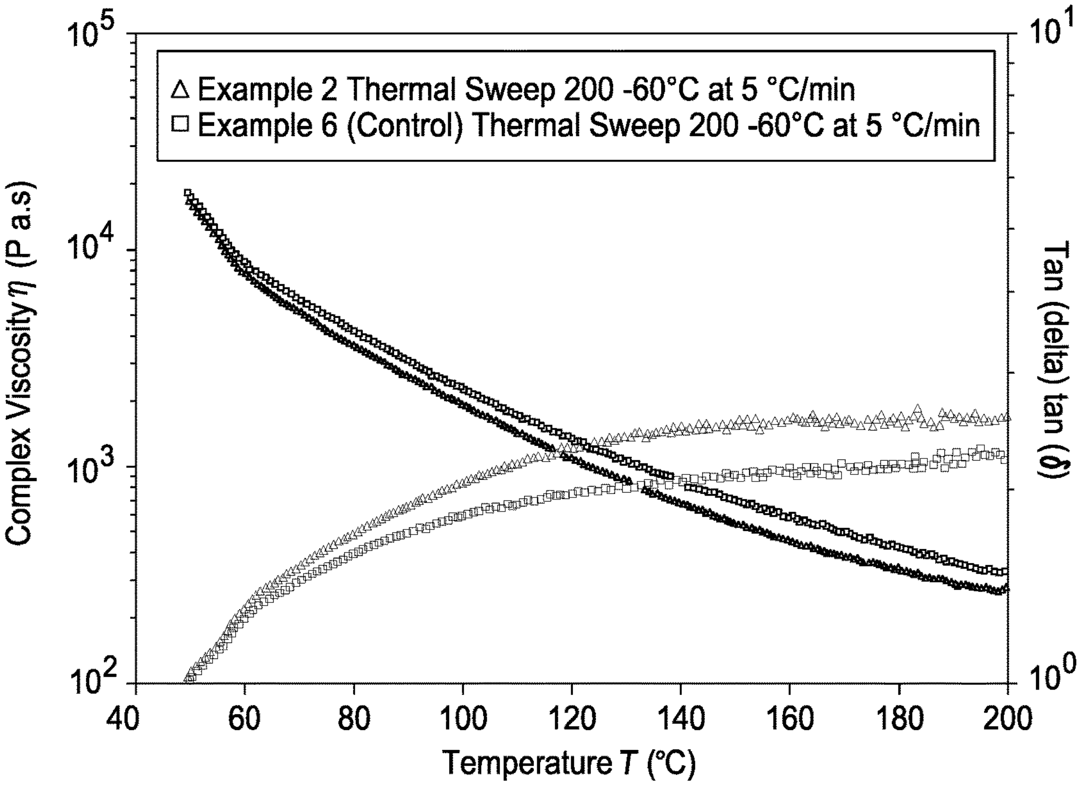
FIG. 4 shows rheology changes (complex viscosity) as a function of temperature for illustrative Example composition 2 and Example composition 6 of the present teachings.

FIG. 4 shows rheology changes (complex viscosity) as a function of temperature for illustrative Example composition 2 and Example composition 6 of the present teachings. The composition of Example 2 comprises 87 wt % adduct as compared to the composition of Example 6, an equivalent mixture of ingredients (a control for Example 2) but with no adduction between the TPU and EVA-based polymers. The viscosity is 1390.8 Pa's at 145° C. for Example 6 while Example 2 has a viscosity of 1138.4 8 Pa's at 145° C. FIG. 4 also shows a higher tan delta for Example 2 at elevated temperatures than the equivalent blend of unreacted polymers. This higher tan delta, which indicates less melt elasticity, and lower viscosity aid in dispensing the molten adhesive.

Figure 5:
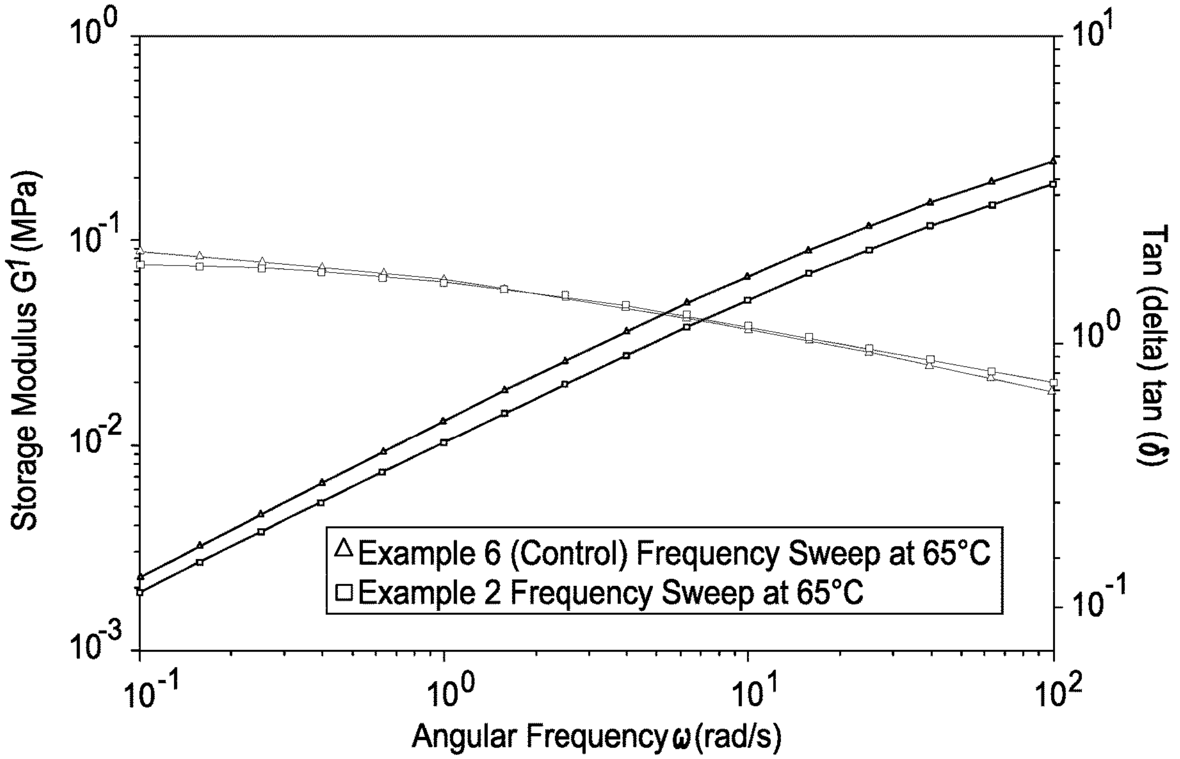
FIG. 5 shows rheology changes (storage modulus) as a function of frequency at 65° C. for illustrative Example composition 2 and Example composition 6 of the present teachings.
Figure 6:
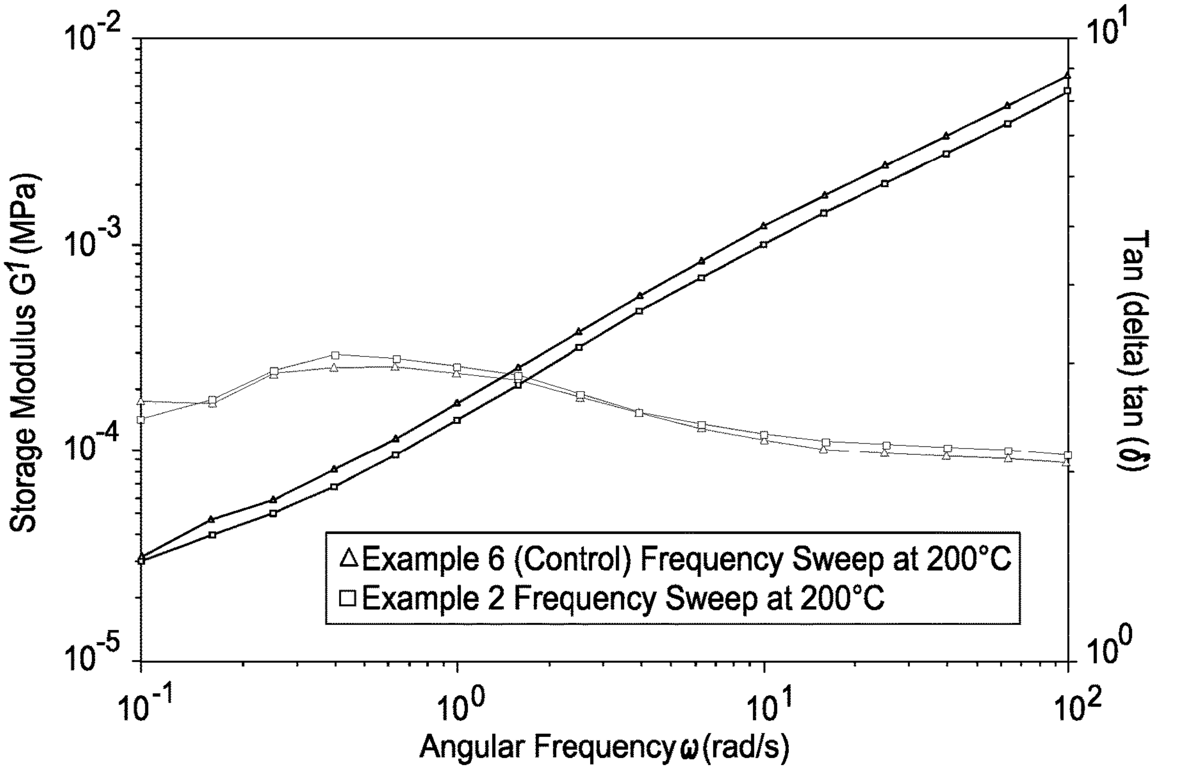
FIG. 6 shows rheology changes (storage modulus) as a function of frequency at 200° C. for illustrative Example composition 2 and Example composition 6 of the present teachings.

FIG. 5 and FIG. 6 show isothermal rheology changes (storage modulus and tan delta), as a function of frequency, for illustrative Examples 2 and 6 compositions of the present teachings. Isothermal frequency sweep data was collected with dynamic mechanical analysis at 65° C. and 200° C. A near zero frequency condition at 65° C. approximates conditions during a creep test at 65° C. Higher frequencies around 200° C. correlate to melt dispensing conditions.

The composition of Example 2 comprises 87 wt % adduct as compared to the composition of Example 6, an unreacted, blended equivalent control with no adduction between TPU and EVA-based polymer.

FIG. 5 demonstrates that at low shear rate (~10-1 rad/s) and 65° C., Example 2 with 87 wt % adduct has a lower tan delta than the control indicating that it has comparatively more elastic than loss character versus Example 6 without adduct. This likely aids in the enhanced creep resistance shown at 65° C.

FIG. 6 demonstrates that at higher shear rate (101-102 rad/s) and 200° C., Example 2 with 87 wt % adduct has a higher tan delta, indicating that it has a comparatively more viscous than elastic character, versus Example 6 without adduct. This greater loss character improves dispensability. The presence of the adducted copolymer allows for greater elasticity (lower tan delta) at low temperature and low shear, while having decreased elasticity (higher tan delta) at high temperature and higher shear rate. This enables both greater creep resistance and improved melt dispensing.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, from 20 to 80, or from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints.

As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

It is understood that the above description is intended to be illustrative and not restrictive. Many embodiments as channel as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. An adhesive or adhesive component comprising:

a reaction product of two or more monomers or prepolymers comprising: a thermoplastic polyurethane component and a chemically modified polyolefin;

wherein the reaction product includes a polymer backbone with segments present for preferred adhesion of a particular substrate type which two or more non-identical substrates are intended to be adhered, that adapts the adhesive or adhesive component for bonding of dissimilar substrates; and wherein the adhesive or adhesive component enables simultaneous bonding to low surface energy substrates and high surface energy substrates.

2. The adhesive or adhesive component of claim 1, including one or more components for forming a hot melt adhesive; and wherein the adhesive or adhesive component is utilized in an amount of 50% to 100%, by weight, in the hot melt adhesive for one or more of improved creep resistance and bonding of the dissimilar substrates.

3. The adhesive or adhesive component of claim 1, wherein the reaction product has differential affinity for two or more substrate types;

wherein the adhesive or adhesive component facilitates bonding to dissimilar substrates with no primer or pretreatment; and wherein the adhesive or adhesive component is applied directly to a first substrate for bonding to a second substrate that is dissimilar to the first substrate.

4. The adhesive or adhesive component of claim 1, wherein the reaction product comprises a copolymer, terpolymer, or higher order polymer adduct.

5. The adhesive or adhesive component of claim 1, which is formed as a film or a powder;

wherein the adhesive or adhesive component is applied to an upper of a shoe, a midsole of a shoe, an outsole of a shoe, or some combination thereof.

6. The adhesive or adhesive component of claim 1, wherein the chemically modified polyolefin is: ethylene vinyl acetate grafted or copolymerized with maleic anhydride content; or polyethylene grafted or copolymerized with maleic anhydride content.

7. The adhesive or adhesive component of claim 6, wherein the adhesive or adhesive component is substantially free of any coupling agent; or is formed by the coupling of dissimilar monomers or prepolymers with polyisocyanates, bismaleimides, carbodiimides, or other coupling agents.

8. The adhesive or adhesive component of claim 6, wherein the thermoplastic polyurethane is chemically bonded to the chemically modified polyolefin in the absence of any coupling agent.

9. The adhesive or adhesive component of claim 1, wherein in forming the reaction product, phase separation of partially or poorly miscible ingredients is avoided; and wherein flow of the adhesive or adhesive component is improved without die swell.

10. An adduct of a thermoplastic polyurethane, and a chemically modified polyolefin, wherein the thermoplastic polyurethane is chemically bonded to the chemically modified polyolefin.

11. The adduct according to claim 10, wherein the chemically modified polyolefin is: an ethylene vinyl acetate grafted or copolymerized with maleic anhydride content; or polyethylene grafted or copolymerized with maleic anhydride content.

12. The adduct according to claim 11, wherein the thermoplastic polyurethane is a hydroxy-terminated thermoplastic polyurethane;

optionally wherein the thermoplastic polyurethane is chemically bonded to the chemically modified polyolefin through a coupling agent selected from polyisocyanates, bismaleimides, and carbodiimides or in the absence of a coupling agent selected from polyisocyanates, bismaleimides, and carbodiimides, preferably in the absence of any coupling agents.

13. The adduct according to claim 10, wherein the thermoplastic polyurethane is a hydroxy-terminated thermoplastic polyurethane, wherein the chemically modified polyolefin is an ethylene vinyl acetate grafted or copolymerized with maleic anhydride content, and wherein the thermoplastic polyurethane is chemically bonded to the chemically modified polyolefin through ester bonds between terminal hydroxy functional groups of the hydroxy-terminated thermoplastic polyurethane and carboxylic acid anhydride functional groups of the ethylene vinyl acetate grafted or copolymerized with maleic anhydride content.

14. A hot melt adhesive polymer formulation comprising or essentially consisting of the adduct according to claim 10.

15. The hot melt adhesive polymer formulation according to claim 14, further characterized by one or more of the following:

wherein the content of the adduct is from about 20 wt % to about 100 wt %, preferably from about 50 wt % to about 100 wt %, relative to the total weight of the hot melt adhesive polymer formulation;

the hot melt adhesive polymer formulation lacks or additionally contains a tackifier resin; and wherein the content of the tackifier resin is up to about 15 wt %; preferably from about 0.5 wt % to about 10 wt %; more preferably from about 1 wt % to about 5 wt %, relative to a total weight of the hot melt adhesive polymer formulation.

16. The hot melt adhesive polymer formulation according to claim 14, which additionally contains one or more free polymers; and wherein the one or more free polymers comprise one or both of:

(a) a thermoplastic polyurethane; wherein the thermoplastic polyurethane is derived from the same monomers as the thermoplastic polyurethane of the adduct and/or wherein the thermoplastic polyurethane has essentially the same weight average molecular weight as the thermoplastic polyurethane of the adduct; or wherein the thermoplastic polyurethane is derived from different monomers as the thermoplastic polyurethane of the adduct and/or wherein the thermoplastic polyurethane has a different weight average molecular weight compared to the thermoplastic polyurethane of the adduct; and (b) a polyolefin, which may be modified or unmodified; wherein the polyolefin is derived from the same monomers as the modified polyolefin of the adduct and/or wherein the polyolefin has essentially the same weight average molecular weight as the chemically modified polyolefin; or the polyolefin is derived from different monomers as the chemically modified polyolefin and/or wherein the polyolefin has a different weight average molecular weight compared to the chemically modified polyolefin; and optionally wherein the content of the polyolefin is up to about 35 wt %, relative to a total weight of the hot melt adhesive polymer formulation; and optionally wherein the content of the thermoplastic polyurethane is from about 5 wt % to about 65 wt %, relative to the total weight of the hot melt adhesive polymer formulation.

17. The hot melt adhesive polymer formulation according to claim 14, which is in a form of a film or a powder; and optionally wherein the hot melt adhesive polymer formulation is applied to an upper of a shoe, a midsole of a shoe, an outsole of a shoe, or a combination thereof.

18. A method for bonding a first substrate to a second substrate, wherein the first substrate is dissimilar to the second substrate, the method comprising the steps of:

(a) applying a hot melt adhesive polymer formulation according to claim 14 to the first substrate, optionally applying by means of a hot melt applicator; and (b) applying the second substrate to the product obtained in step (a) such that the hot melt adhesive polymer formulation is located between the first substrate and the second substrate.

19. The adhesive or adhesive component of claim 5, wherein the adhesive or adhesive component bonds to at least two of an ethylene vinyl acetate-based foam midsole, a polyurethane-based shoe upper, and a non-woven polyester.

20. The adhesive or adhesive component of claim 6, wherein the thermoplastic polyurethane is chemically bonded to the chemically modified polyolefin in the absence of any coupling agent.

* * * * *